US006480549B1

(12) United States Patent
Hirzel et al.

(10) Patent No.: US 6,480,549 B1
(45) Date of Patent: *Nov. 12, 2002

(54) METHOD FOR DETERMINING ATTENUATION IN A DIGITAL PCM CHANNEL

(75) Inventors: Frederic J. Hirzel, Sunnyvale, CA (US); Victor Demjancuko, Pendleton, NY (US)

(73) Assignee: Vocal Technologies, Ltd., Buffalo, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,331

(22) Filed: Apr. 7, 1998

Related U.S. Application Data

(60) Provisional application No. 60/043,066, filed on Apr. 8, 1997.

(51) Int. Cl.⁷ .............................................. H04B 14/04
(52) U.S. Cl. ...................................... 375/242; 375/222
(58) Field of Search ................................ 375/242, 245, 375/243, 254, 285, 287, 346, 224, 227, 228; 379/1

(56) References Cited

U.S. PATENT DOCUMENTS 4,004,140 A * 1/1977 Izumi et al.
5,394,437 A   2/1995 Ayanoglu et al.

(List continued on next page.)

FOREIGN PATENT DOCUMENTS

| EP | 0 833 481 | 4/1998 |
| WO | WO 96/18261 | 6/1996 |
| WO | WO 98/13977 | 4/1998 |

OTHER PUBLICATIONS

I. Kalet et al., *The Capacity of PCM Voiceband Channels,* 1993 IEEE International Conference on Communications ICC'93, pp. 507–511.

*Primary Examiner*—Jean Corrielus
(74) *Attorney, Agent, or Firm*—Foley & Lardner

(57) ABSTRACT

A method of determining digital channel attenuation; comprising the steps of: receiving a known training sequence of PCM codes, which PCM codes are subjected to the attenuation within the digital channel; quantizing the received known training sequence of PCM codes according to a predetermined thresholding procedure; identifying identical PCM codes created as a result of the thresholding procedure; and, determining the attenuation of the digital channel based upon the identification of identical PCM codes. A method is also disclosed for determining a digital channel PCM code transformation comprising receiving a known training sequence of PCM codes, which PCM codes are subjected to the PCM code transformation within the digital channel, quantizing the received known training sequence of PCM codes according to a predetermined thresholding procedure, and determining the transformation of transmitted codes to those received. A method is also disclosed for improved echo cancellation in a communications network having an analog and a digital modem, comprising saving codes transmitted from the digital modem to the analog modem for echo cancellation, transforming, by a mapping table, codes transmitted from said digital modem to codes received by the analog modem, and, using the received codes as a reference signal for cancellation of echo. A method of improved spectral shaping using a transmit shaping transfer function in a communications network having an analog and a digital modem, comprising, transforming, by a mapping table, codes transmitted from the digital modem to codes received by the analog modem, using the received codes for transformation to their linear value equivalent representations, and, applying the linear value representations to the transmit shaping transfer function.

3 Claims, 1 Drawing Sheet

U.S. PATENT DOCUMENTS

| | | | |
|---|---|---|---|
| 5,485,522 A | * | 1/1996 | Solve et al. |
| 5,663,982 A | | 9/1997 | Hodge et al. |
| 5,671,251 A | | 9/1997 | Blackwell et al. |
| 5,754,594 A | | 5/1998 | Betts et al. |
| 5,875,229 A | * | 2/1999 | Eyuboglu et al. .............. 379/1 |
| 5,991,278 A | | 11/1999 | Betts |
| 6,072,825 A | | 6/2000 | Betts et al. |

\* cited by examiner

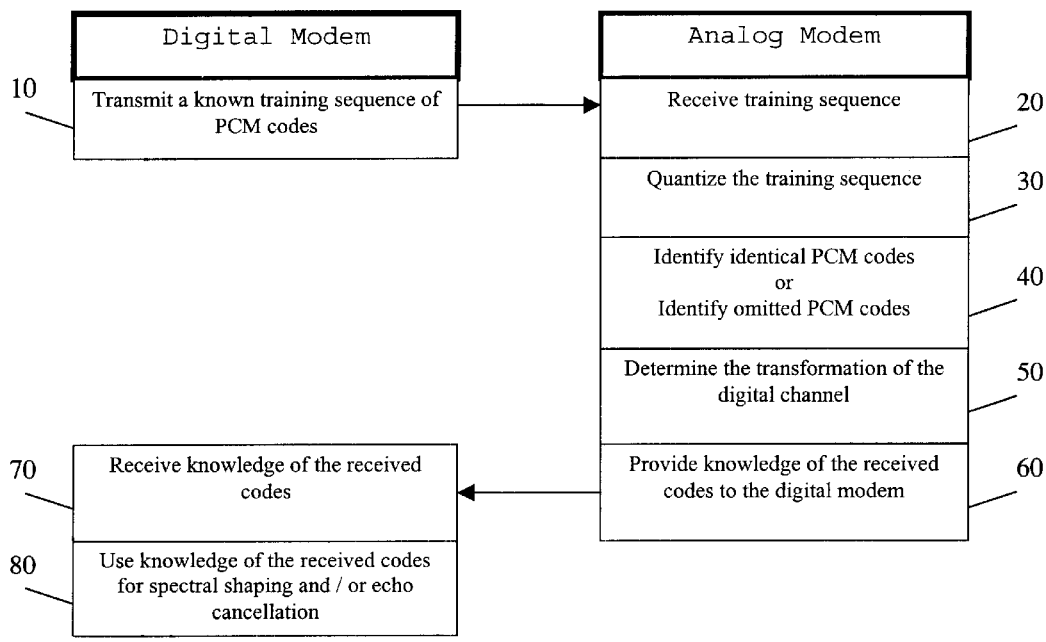

METHOD FOR DETERMINING ATTENUATION IN A DIGITAL PCM CHANNEL

This nonprovisional patent application claims the benefit under 35 U.S.C. Section 119(e) of U. S. Provisional Patent Application No. 60/043,066 filed on Apr. 8, 1997.

COMPUTER PROGRAM LISTING APPENDIX

Incorporated by reference herein is a computer program listing appendix submitted on compact disc herewith and containing ASCII copies the following files: PCMMAP.C, 23 KB, created Aug. 7, 1998; MATH.C, 4 KB, created Mar. 17, 1997; PCM.H, 2 KB, created Mar. 17, 1997; PCMCNV.C, 7 KB, created Mar. 14, 1997; and STANDARD.H, 7 KB, created Mar. 14, 1997.

1. Field of the Invention

This invention pertains generally to modem technology, more specifically to PCM modem technology, and more specifically, to a method for the discovery of the digital attenuation from a set of received PCM samples corresponding to a known set of transmit PCM samples.

2. Background of the Invention

This invention provides a method for the discovery of the digital attenuation from set of received pulse code modulation CPCM) samples corresponding to a known set of transmit PCM samples. The principal feature set used is the knowledge of which received PCM codes have become indistinguishable (i.e., are identical) as a result of the attenuation mapping. An alternative but equivalent feature set would be use of the absent received PCM codes.

The question of digital attenuation PAD mapping has been raised at recent meetings of the Telephone Industry of America (TIA) PCM Modem Ad-hoc Committee. Many participants have been hoping for a single industry standard mapping solution. We provide a solution, which will allow PCM modems to function properly throughout the entire telephone network including with private telephone equipment (PBX's and key systems).

TIA 464A

TIA 464A is the industry standard plan for private telephone equipment. Among other recommendations, this specification provides the recommended losses between T1 lines and other devices. If a PBX is designed according to the loss-plan specification as outlined in sections 4.8.4 and 4.8.5 of 464A, then it should not be necessary to attenuate the PCM on incoming T1 lines for on-premise (ONS) connections, since the recommended 3-dB loss is typically implemented in the analog circuitry of the ONS codec.

However, Inter-Tel's experience with customers using T1 lines suggests that the recommended 3-dB of insertion loss is inadequate and that T1 attenuation pads are indeed necessary. While the standard —3 and —6dB pads are usually adequate, Inter-Tel has provided a wider-range of insertion loss as options for PBX customers. Inter-Tel has implemented digital gain control on its T1 line cards using two different methods:

ROM-based mapping
DSP-based algorithm

ROM Based Mapping

Inter-Tel first implemented attenuation pads via an EPROM circuit, which used the incoming PCM code as 8 bits of an address and additional address bits selecting the attenuation in 1 dB increments. The output of the EPROM was the attenuated digital PCM code. In this implementation, the attenuation range covered from 0 dB to —12 dB in 1 dB steps.

Experience with customers shows that 0 to —6dB seems to be the most-often used range of T1 pad values. Taking into account the fixed 3-dB of loss included with our ONS card, the net insertion loss for to Digital CO connection is then—3dB to—9dB, which mimics well the typical net losses experienced by customers on ONS to Analog CO connections.

All attenuation tables in the EPROM preserved the LSB of the PCM to preserve the state of the Robbed Bit Signaling (RBS), if present. However, the preservation of the LSB is unnecessary if no RBS information passes through the ROM-based gain control circuitry.

DESCRIPTION OF THE DRAWINGS

FIG. 1 shows a process in accordance with an embodiment of the invention.

The ROM-based look-up tables were generated by a custom C program using the following algorithm:

1. Expand incoming 8-bit, u-Law PCM to corresponding 14-bit, signed integer linear value, x
2. Calculate output, y, based on equation: $y = INT[x*10^{(gain/20)}+0.500]$
3. Compress y back into its corresponding 8-bit u-Law value using G.711 decision values.

In addition to performing u-Law to u-Law digital gain control (DGC) through look-up tables, the EPROM also performs DGC through look-up tables for the following compression schemes:

u-Law-to-A-law
A-law-to-u-Law
A-law-to-A-law

DSP Based Mapping

With the advent of DSP's, for their greater flexibility, the latest implementation uses the Analog Devices 21xx fixed point family of processors. The PCM codes are converted to/from linear values by the ADSP-21xx internal companing hardware. Inter-Tel's algorithm normalizes the linear value before applying the attenuation multiplier. The attenuation is selectable as a linear 1.15 fractional multiplier. The user interface selects the attenuation in fixed, 1-dB steps over a similar range as the previous implementation. The user configured dB attenuation is converted to the linear fractional multiplier by an algorithm. Moreover, the instructions in the Analog Devices DSP can use unbiased rounding, truncation and in newer family members, biased rounding. Inter-Tel's implementation uses the unbiased rounding option (RND) during the MAC instruction. This flexibility in rounding and truncation obviously can have a substantial effect on the actual attenuation mapping, with the additional caveat of having potentially different mappings for positive and negative PCM codes.

Detailed Description of the Preferred Embodiment

Detection of the Feature Set

After a receiver's equalizer has been trained, a known transmit sequence of PCM codes can be sent and received using either all or a useful subset of PCM codes. (This sequence may need to be sent multiple times to cover all 6 or 12 bit positions in a robbed bit signaling system.) The receiver can save the linear values for each received PCM code. From the known step size between adjacent PCM codes, the receiver can determine those PCM samples that it received which are indistinguishable. The indistinguishable samples arise from two transmit PCM codes which when scaled by the same attenuation and quantized according to a thresholding procedure create identical PCM codes.

An example taken from the attached attenuation table (pages A1–A2) which shows the attenuation for each uLaw PCM code when it is transformed by shifting from 1 to 26 codes numerically.

Example:

| Transmitted | | Received shifted by 1 PCM code | | | |
|---|---|---|---|---|---|
| uLaw | Linear | uLaw | Threshold | Attenuation | dB |
| 129 | 7775 | 129 | 7647 | 0.983537 | −0.14419 |
| 128 | 8031 | | 7903 | 0.984062 | −0.13955 |

Processing of Indistinguishable PCM Codes

The processing of the feature set relies on knowledge of the coding law (uLaw or Alaw) used. In practice, it is necessary to consider the preciseness of the numerics used in the attenuation process. Suggestions for accommodating implementation deviations is discussed in a later section. The attached C language source code provided as part of this application (pages B1–B21) implements a demonstration of the identification procedure indistinguishably codes. The basic algorithm is the following:

1. For each indistinguishable PCM code received, the original pair of transmitted PCM codes can be determined since the PCM codes are sent in a known training sequence. A set of indistinguishable transmitted PCM code pairs are determined from this training sequence.
2. For the first indistinguishable PCM code pair, determine the minimum attenuation required for the larger transmitted PCM code to be attenuated to a number of successive lower PCM codes. (A set of 30 successive lower PCM codes would be sufficient to cover an attenuation range of approximately 11 dB.) Then determine the maximum attenuation permitted for the smaller transmitted PCM code to be attenuated to the same successive lower PCM codes. (Minimum attenuation is numerically closer to one, i.e., a lesser attenuation, while a maximum attenuation is a greater attenuation.) If the maximum attenuation is a smaller attenuation than the minimum attenuation, discard the attenuation range as it represents a missing code rather than an indistinguishable code. The minimum and maximum attenuations for each successive lower PCM code forms an initial set of candidate attenuation ranges.
3. For each successive indistinguishable transmit PCM code pair, another set of possible attenuation ranges is determined using the procedure as described in Step 2. Each element of the candidate attenuation range set created in Step 2 is searched for either full or partial overlap with any element of the possible attenuation range set. (In case of partial overlap, the attenuation range in the candidate set can be reduced for refined attenuation accuracy.) In case of no overlap, the candidate attenuation range should be discarded. The discard occurs because two different indistinguishable codes must arise from the same linear transformation.
4. Step 3 is repeated for successive pairs of indistinguishable transmit PCM code pairs until either a) the set of candidate attenuation ranges is reduced to a single range or b) all the pairs of indistinguishable transmit PCM code pairs have been processed.

In the first case, the actual attenuation is bounded by the single remaining attenuation range. We can say it is the detected attenuation can be the average of the high and low attenuations. Alternatively, if the history of each overlapping attenuation range is maintained (or regenerated) a probabilistic approach of determining a weighted median value for determining the detected attenuation can be implemented.

For the second case where the attenuation appears to remains non-unique, the set of candidate attenuation ranges can be used to determine multiple sets of indistinguishable PCM code pairs can be determined for each candidate attenuation. The generated sets of indistinguishable PCM code pairs can then be matched with the original received set. The generated set using the correct attenuation should match nearly identically if not identically. The sets corresponding to incorrect potential attenuations would generate significant number of additional pairs of indistinguishable PCM code pairs or have missing indistinguishable PCM code pairs. Thus the correct detected attenuation can still be determined using this procedure. (Multiple candidate attenuations appear to arise from attenuations of 6 dB or greater combined with the decreasing step sizes used in with uLaw or Alaw companding.)

Processing of Missing PCM Codes

The procedure described above for using indistinguishable PCM codes to determine the attenuation can be adapted to operate with missing received PCM codes. The transmitted PCM codes corresponding each of the received PCM codes around the missing PCM code can be determined. Follow the same algorithm except that the minimum and maximum attenuations are exchanged in the algorithms. In other words, the larger transmitted PCM code produces the maximum attenuation and the smaller transmitted PCM code produces the minimum attenuation. With this adaptation, the algorithm described remains essentially the same.

Example:

| Transmitted | | Received shifted by 1 PCM code | | | |
|---|---|---|---|---|---|
| uLaw | Linear | uLaw | Threshold | Attenuation | dB |
| 144 | 3999 | 144 | 3935 | 0.983996 | −0.14013 |
| 143 | 4191 | | 4063 | 0.969458 | −0.26942 |

Other Variations

For robustness with real signals corrupted by noise, it may be desirable to allow a certain number of pairs of indistinguishable PCM codes not to match a candidate range. An alternative to simply dropping a candidate attenuation range would be to use a probabilistic greatest likelihood model for selection of the detected attenuation.

Furthermore, given that implementers of digital attenuation pads may understand and implement the mapping process slightly differently (i.e., use of G.711 threshold values or average between PCM codes) and allow various inaccuracies in the numerical operations (numeric representation, rounding, truncation, etc.), each candidate attenuation range may need to be broadened to make overlap again more likely. The broadening can be by a fixed value or a relative amount about the attenuation computed. The previous suggestion of discarding a certain number of pairs of indistinguishable PCM codes also addresses this problem as very few pairs are likely to be affected by these numerical inaccuracies.

As for digital attenuation pads that pass through the robbed bit signaling (RBS) information, the algorithms presented can also be applied except that the indistinguishable transmit PCM code pairs will be separated by one code and a second indistinguishable transmit PCM code pair will adjacent. The candidate attenuation ranges become bigger, but still can be matched by the procedures presented in this invention.

The procedures described in this invention suggest a robust manner to identify the digital channel attenuation though the use of received PCM codes corresponding to a known transmit PCM code sequence. The use of such an algorithm would be necessary when the FCC permits the channel power to be increased in compensation for the systematic digital attenuations.

We further suggest that knowledge of the exact received PCM code set may be preferred by both the analog and digital PCM modems. Echo cancellation in the digital PCM modem may operate with incrementally better performance with the knowledge of actual PCM codes presented to the Codec. The receiver's desired spectral shaping can be more precisely honored by having the transmitter use the knowledge of the actual PCM codes presented to the Codec in the shaping function implementation, then reversely mapping the PCM code after shaping to the transmit PCM code to be sent.

The exclusive use of pre-identified attenuation table mappings would make the PCM modem technology incapable of operating with existing private telephone equipment. It is recommended that the attenuation pad mappings be discovered for each connection.

FIG. 1 shows a process in accordance with an embodiment of the invention. Initially a digital modem transmits (10) a known training sequence of PCM codes to an analog modem. The training sequence is received (20) at the analog modem where it is quantized (30). Identical PCM codes or omitted PCM codes of the training sequence are then identified (40). Using the identical or omitted PCM codes, the transformation of the digital channel is then determined (50). Subsequently, knowledge of the received codes is provided (60) to the digital modem. When received (70), the digital modem may use the knowledge of the received codes for spectral shaping or echo cancellation (80).

What we claim is:

1. A method of determining digital channel attenuation, comprising:

receiving a known training sequence of PCM codes, which PCM codes are subjected to said attenuation within said digital channel;

quantizing said received known training sequence of PCM codes according to a predetermined thresholding procedure;

identifying identical PCM codes created as a result of said thresholding procedure; and, determining said attenuation of the digital channel based upon said identification of identical PCM codes.

2. A method of determining digital channel attenuation, comprising:

receiving a known training sequence of PCM codes, which PCM codes are subjected to said attenuation within said digital channel;

quantizing said received known training sequence of PCM codes according to a predetermined thresholding procedure;

identifying PCM codes omitted as a result of said thresholding procedure; and, determining said attenuation of the digital channel based upon said identification of omitted PCM codes.

3. A method of determining a digital channel PCM code transformation comprising:

receiving a known training sequence of PCM codes from a digital modem, which PCM codes are subjected to said PCM code transformation within said digital channel;

quantizing said received known training sequence of PCM codes according to a predetermined thresholding procedure;

determining the transformation of transmitted codes to those received resulting from transmission of the PCM codes through the digital channel; and providing knowledge of the received PCM codes to the digital modem.

* * * * *